United States Patent [19]
Hüttlin

[11] Patent Number: 6,009,847
[45] Date of Patent: Jan. 4, 2000

[54] OSCILLATING-PISTON MACHINE

[76] Inventor: Herbert Hüttlin, Wiesentalstrasse 74 A, D-79539 Lörrach, Germany

[21] Appl. No.: 09/277,654

[22] Filed: Mar. 26, 1999

Related U.S. Application Data

[63] Continuation of application No. PCT/EP97/05245, Sep. 24, 1997.

[30] Foreign Application Priority Data

Sep. 26, 1996 [DE] Germany .............................. 196 39 503

[51] Int. Cl.[7] .................................................... F02B 53/00
[52] U.S. Cl. ........................................... 123/241; 418/270
[58] Field of Search ............................. 123/241; 418/253, 418/270

[56] References Cited

U.S. PATENT DOCUMENTS

| | | |
|---|---|---|
| 5,304,049 | 4/1994 | Lew . |
| 5,305,716 | 4/1994 | Hüttlin . |

FOREIGN PATENT DOCUMENTS

| | | | |
|---|---|---|---|
| 1401969 | 1/1969 | Germany | ............................... 123/241 |
| 1 551 101 | 7/1970 | Germany . | |
| 2439319 | 2/1976 | Germany | ............................... 123/241 |
| 196 39 503 C1 | 1/1998 | Germany . | |
| 1518555 | 10/1989 | U.S.S.R. | ............................... 123/241 |
| 1 500 619 | 2/1976 | United Kingdom . | |
| 1 470 648 | 4/1977 | United Kingdom . | |

*Primary Examiner*—Michael Koczo
*Attorney, Agent, or Firm*—St. Onge Steward Johnston & Reens LLC

[57] ABSTRACT

An oscillating-piston engine comprises a housing in which multiple pistons are each arranged pivotably about a piston axis parallel to a central housing axis and are movable together in a revolution direction about said housing axis. It is proposed to arrange, centrally in said housing, a cam piece which is immovable with respect to said housing, there being configured, on the sides of said pistons facing said cam piece, running surfaces which, as said pistons revolve along an outer contour of said cam piece, are guided in constant contact therewith.

24 Claims, 12 Drawing Sheets

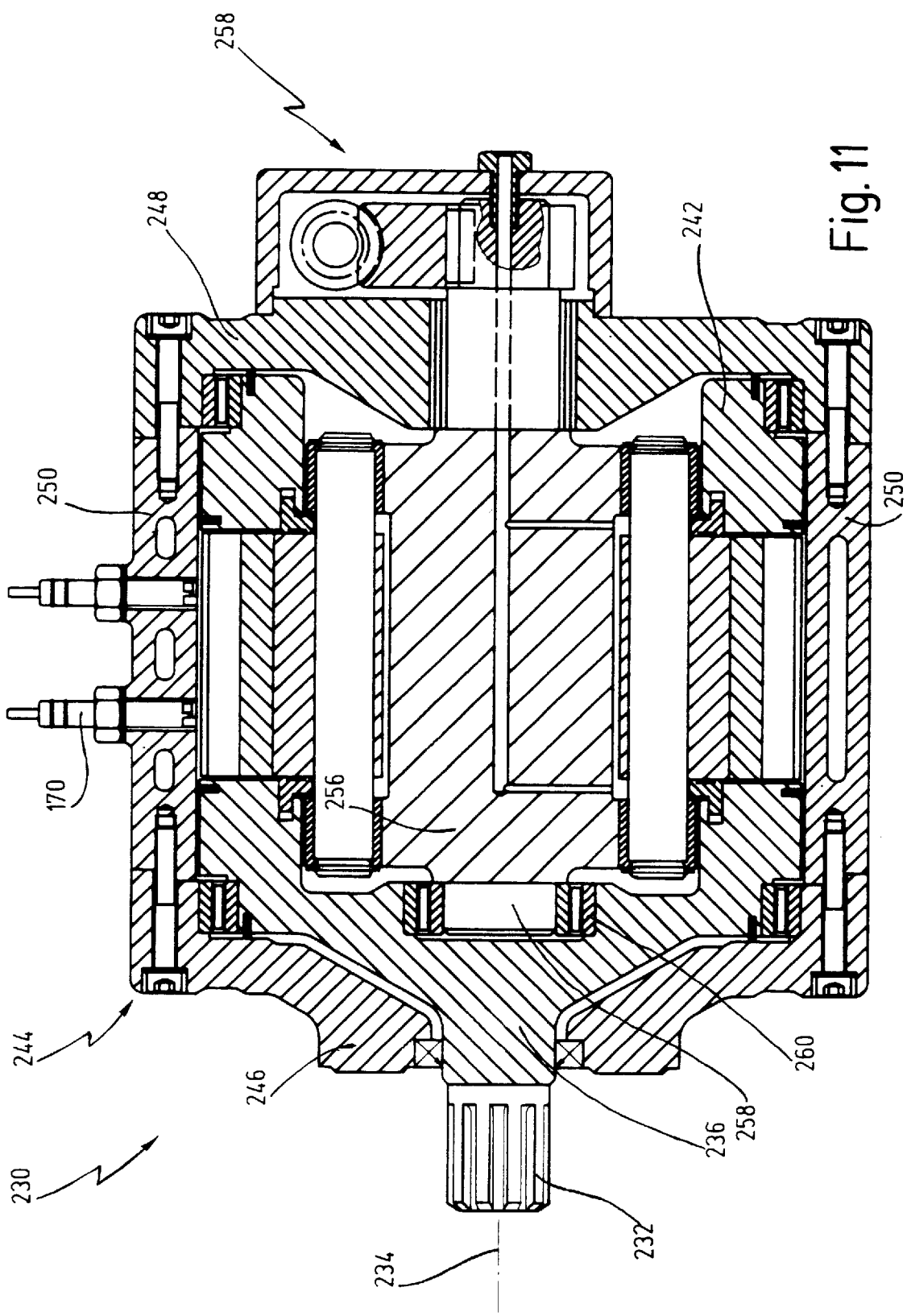

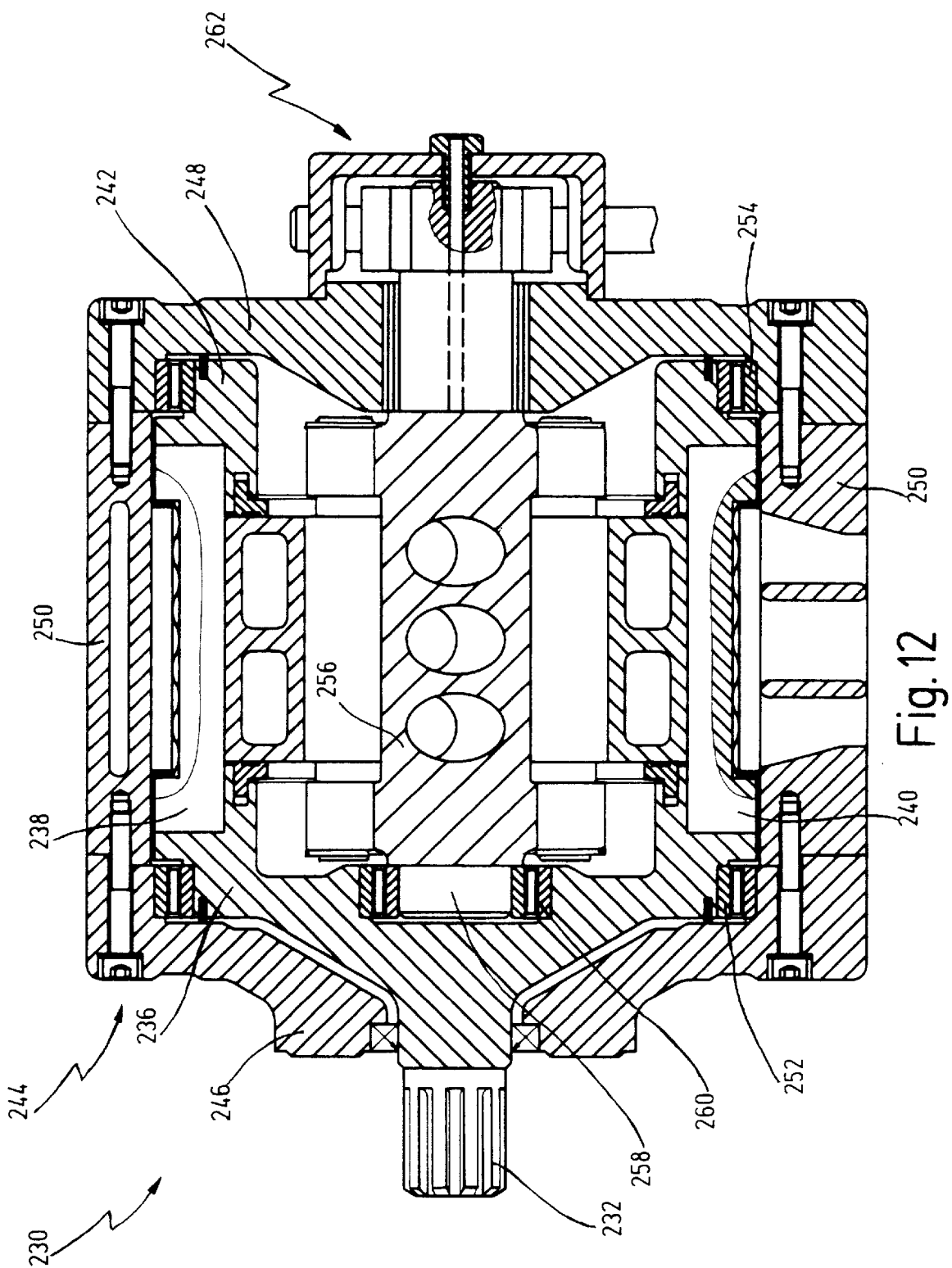

OSCILLATING-PISTON MACHINE

This application is a continuation of pending international application PCT/EP97/05245, filed Sep. 24, 1997, which designated the United States.

BACKGROUND OF THE INVENTION

The present invention relates to an oscillating-piston engine having a housing with a circular inner wall in which several piston configured as two-armed levers, of which each two adjacent pistons are in rolling engagement with one another, are each arranged pivotably about a piston axis parallel to a central housing axis and are moveable together in a revolution direction, said piston axes revolving about said housing axis on a circular track concentric with said inner wall of the housing.

An oscillating-piston engine of this kind is known from WO 93/01395.

Oscillating-piston engines belong to a species of internal combustion engines in which the individual working strokes, i.e. intake, compression, ignition, expansion, and expulsion of the combustion mixture, are mediated by rocker-like pivoting movements of the individual pistons between two end positions. The pivoting movement of the pistons is converted by corresponding intermediate members into a rotary movement of an output shaft.

In a first embodiment described in the document cited initially, the pistons are arranged in inherently stationary fashion in the housing, and perform only back-and-forth pivoting movements between two end positions. In order to convert the pivoting movements into rotary movements of an output shaft arranged centrally in the housing, the output shaft is joined in fixed-axis fashion to cam follower members, eccentric with respect to the shaft and located diametrically opposite one another, on which the surfaces of the pistons facing the output shaft roll. For this purpose, these piston surfaces facing the output shaft are of defined parabolic configuration, while the cam follower members are cylindrical in shape.

It is viewed as disadvantageous, with this known design for an oscillating-piston engine, that when the pistons are in the dead center positions, i.e. the positions at which a reversal of their pivoting movement takes place, the torque at low engine speeds is small; this is explained by the fact that the pistons are arranged in stationary fashion in the housing.

In a second exemplifying embodiment described in the document cited initially, the pistons not only are mounted pivotably in the housing, but moreover are movable in a revolution direction about the central housing axis.

When this oscillating-piston engine runs, the pistons therefore execute movements which result from a superposition of the rocker-like pivoting movements and the circular revolving movement of the pistons. As compared with the embodiment described earlier, the combined pivoting and revolving movement means that the cam follower members are droplet-shaped in cross section rather than cylindrical, while the surfaces of the pistons facing the output shaft, which is still arranged centrally, have the shape of a quarter-circle. As the pistons revolve, the droplet-shaped cam follower members roll on these surfaces of the piston, and each of the two cam follower members that are present is thereby caused to rotate. The droplet-shaped cam follower members are joined to the output shaft not in fixed-axis fashion but via a gear linkage arranged in the housing, in order to transfer their inherent rotation to the output shaft.

For this purpose, each of the cam follower members has a pinion, joined immovably to it, which is in geared engagement with an idler gear that in turn meshes with a central gear that is mounted on the output shaft.

Although the shape of the torque curve is more favorable with this embodiment than with the embodiment described earlier, this design is technically much more complex. The number of moving parts in this oscillating-piston engine is increased by the fact that now the cam follower members themselves are also rotatably mounted, and that several pinions are provided in order to transfer the rotary movements of the cam follower members to the output shaft.

The cam follower members have the function not only of controlling the pivoting movements of the individual pistons, but also of transferring all the drive force of the pistons to the output shaft. The bearings of the cam follower members must accordingly be of very stable configuration.

In addition, the functionally dictated droplet-shaped profile of the cam follower members is disadvantageous because they taper in relatively pointed fashion, so that as the pistons revolve, when the pistons pass over the tip of the cam follower members there is a "hard" transition between the gently curved and sharply curved rolling regions during rolling. This contributes to a reduction in the smoothness of run of this oscillating-piston engine.

DE Published Application 15 51 101 discloses a centrifugal piston internal combustion engine which has six pistons of approximately triangular shape, spaced apart from one another, which are mounted pivotably on a circular input drive gear in such a way that as they revolve in the housing of the engine, they are pressed by the resulting centrifugal forces against the inner wall of the housing. The pistons are guided independently of one another along the inner wall. In order to achieve the oscillating movements of the pistons, the inner wall of the housing is of approximately oval or trochoidal configuration. Arranged centrally in the housing are two stationary guide cams which ensure, even at low engine speeds at which the centrifugal forces are small, that the pistons are pressed against the inner wall of the housing in order to maintain the functionality of the engine at low engine speeds. The guide cams have no function at high engine speeds.

Also known, from GB Patent 1 470 648, is a rotary piston engine in which a total of four pistons are arranged in the engine housing, each two diametrically opposing pistons forming a piston pair. The inner wall of the housing is of approximately elliptical configuration, the pistons being again, as in the case of the centrifugal piston internal combustion engine cited above, guided along the inner wall as they revolve in the housing in order to achieve the working strokes of the engine. Adjacent pistons are each joined to one another in such a way that the joining points respectively form a seal which is always in contact against the inner wall. Also arranged centrally in the interior of the housing are two stationary cam follower members, elliptically shaped to correspond to the inner wall, on which piston-mounted rollers run in order to press the pistons against the inner wall of the housing. One cam follower member is provided for each piston pair, the two cam follower members being differently configured.

SUMMARY OF THE INVENTION

It is thus the object of the invention to develop further an oscillating-piston engine of the kind cited initially in such a way as to eliminate the disadvantages of the existing art, in particular to reduce the technical complexity of the oscillating-piston engine, and at the same time to increase smoothness and achieve high torque even at low engine speeds.

In terms of the oscillating-piston engine cited initially, the underlying object of the invention is achieved, according to the present invention, in that a cam piece immovable with respect to the housing is arranged centrally in the housing, there being configured, on the sides of the pistons facing the cam piece, running surfaces which, as the pistons revolve along an outer contour of the cam piece, are guided in constant contact therewith in such a way that the pivoting movements of the pistons during revolution are controlled, regardless of the revolution speed, exclusively by the guidance of the pistons along the outer contour of the cam piece in coaction with the rolling engagement.

The invention thus departs from the concept of arranging the cam follower members, of which two were provided in the oscillating-piston engines known from the existing art as defined in WO 93/01395, eccentrically with respect to the housing axis as well as movably. Instead, according to the present invention a centrally arranged cam piece immovable with respect to the housing is provided, thus substantially decreasing the complexity of the oscillating-piston engine according to the present invention, since substantially fewer moving parts are provided in the housing. This in turn contributes advantageously to an increase in the smoothness of the oscillating-piston engine according to the invention.

Guidance of the running surfaces of the pistons against the outer contour of the cam piece in continuous contact therewith advantageously guarantees that the individual movement sequences of the pistons—which, as already mentioned, comprise a superposition of pivoting and revolving movements—can be exactly controlled, thus eliminating, in every movement position of the pistons, undesired constraining forces acting upon the pistons as a result of uncontrolled movements of the pistons. The exact guidance of the pistons improves the functional reliability of the oscillating-piston engine and increases service life.

It has also been found that with the central arrangement, immovable with respect to the housing, of the cam piece according to the present invention, it is possible for the outer contour of the cam piece guiding the pistons to be configured, with a corresponding arrangement of the running surfaces on the pistons, in such a way that in contrast to the droplet-shaped contour of the movable cam follower members as defined in the existing art, they have exclusively curvatures which transit gently into one another, thus ensuring "soft" and therefore quiet guidance of the pistons, which in turn decreases wear. It has furthermore been found that by way of the central arrangement of the cam piece immovably with respect to the housing, the torque characteristic of the oscillating-piston engine can be enhanced even at low engine speeds, as compared to the torque characteristic of oscillating-piston engines known from the existing art with movable cam follower members.

The object is entirely achieved in this fashion.

In a preferred embodiment, the outer contour of the cam piece corresponds exactly to the trajectory of a point on the running surface located closest to the housing axis, said trajectory resulting from the superposition of the pivoting and revolving movements of the pistons during one full revolution.

The advantage of this feature is that the pistons are guided along the outer contour of the cam piece in such a way that the pistons revolve around the cam piece during a full revolution with continuous contact between the running surfaces and the outer contour of the cam piece, and in that context execute the pivoting movements corresponding to the working cycles in the absence of any constraining forces acting on the pistons which might result in an impairment of reliability. In other words, the outer contour is adapted to the "natural" trajectory resulting from the pivoting and revolving movements. The smoothness of the oscillating-piston engine according to the present invention is thereby further enhanced.

In a further preferred embodiment, the cam piece extends axially over approximately the entire length of the housing, but the running surfaces of the pistons and the outer contour of the cam piece are in contact only in axially limited regions.

The advantage of this feature is that exact guidance of the pistons along the central cam piece is guaranteed, and at the same time frictional losses on the mutually contacting running surfaces of the pistons and the cam piece are reduced. Lower frictional losses have the advantage that the efficiency of the oscillating-piston engine according to the invention is enhanced, and that wear on the running surfaces and on the outer contour of the cam piece is reduced.

It is further preferred if the pistons are configured as two-armed levers, and the running surfaces are arranged at one end of one of the two lever arms of the pistons.

Since the pivot stroke is longest at the end of the pistons configured as two-armed levers, the advantage of this feature is that as the pistons revolve around the cam piece, the pivoting movement of the pistons about their respective piston axes is assisted with the greatest possible torque by the running surfaces arranged at the end of the lever arms. This arrangement of the running surfaces on the pistons thus allows well-defined guidance and control of the pistons.

In a further preferred embodiment, the running surfaces of the pistons are surfaces of rollers mounted rotatably on the pistons.

The advantage of this feature is that the rollers roll on the outer contour of the cam piece, thus further reducing frictional losses between the running surfaces of the pistons and the outer contour of the cam piece. This means that less lubrication of the contact surfaces between the running surfaces of the pistons and the outer contour of the cam piece is necessary, and wear on the surfaces running against one another is decreased.

It is preferred in this context if the rollers have a semidiameter which is less than the radius of curvature of concave segments of the cam piece.

The advantage of this feature is that in every position of the pistons, a substantially linear contact is achieved between the running surfaces of the pistons and the outer contour of the cam piece. The advantage of a linear contact is that the running surfaces of the pistons run in smooth and defined fashion, without irregularities, against the outer contour of the cam piece while the pistons revolve.

In an alternative preferred embodiment, the running surfaces are surfaces of piston-mounted sliding elements.

The advantage of this feature is that the number of moving parts in the rotating piston engine according to the present invention is further decreased. With piston-mounted sliding elements, it is also possible to achieve equally exact guidance of the pistons as they revolve around the cam piece. With this embodiment of the running surfaces of the pistons, the technical complexity is thus advantageously decreased.

It is further preferred if the running surfaces are of partially circular configuration at least in the regions which are in contact with the outer contour of the cam piece.

The advantage of this feature is that with piston-mounted sliding elements as well, "soft" guidance of the pistons is achieved in a manner adapted to the pivoting and revolving movements which are superimposed during revolution of the pistons, by the fact that the contact points between running surfaces of the pistons and the outer contour of the cam piece are substantially linear.

In a preferred embodiment, the pistons are each mounted on an axially extending journal rod, the journal rods together being joined at their ends to respective annular elements that are movable in a revolution direction.

With this feature, a common revolving movement of the pistons is achieved, in an advantageous and simply designed manner, by way of the two axially laterally arranged annular elements. This further creates the possibility of transferring the rotary movement of the annular elements to a corresponding output shaft.

It is preferred in this context if at least one of the annular elements has an external tooth set which meshes with a corresponding external tooth set of an output shaft running parallel to the housing axis and arranged eccentrically with it.

The advantage achieved thereby is that the rotary movement of the annular element or elements can be transferred directly to the output shaft without the interposition of connecting members, thus avoiding power losses brought about, as in the existing art, by a linkage consisting of multiple pinions.

In a further preferred embodiment, the pistons are axially externally sealed at their axial ends by a seal which has multiple axially inwardly projecting sealing ridges which rest sealingly against the pistons.

The result of this feature is to achieve a particularly reliable seal for the pistons, since the axially inwardly projecting sealing ridges possess a multiple sealing effect, and the individual sealing ridges individually rest sealedly against the pistons.

In a further preferred exemplifying embodiment, the cam piece is rotatable about the housing axis in order to change the ignition point, and can be locked in a rotated position.

With this exemplifying embodiment, the particular advantage is the fact that because of the rotatability of the cam piece, the ignition point of the oscillating-piston engine according to the present invention can be varied. A change in the ignition point is brought about by rotating the cam piece from its neutral position either clockwise or counterclockwise, thus displacing the top dead center point (TDC) clockwise or counterclockwise relative to the stationary spark plug or plugs, so that ignition of the fuel/air mixture takes place before or after the top dead center point is reached, corresponding to retarded or advanced ignition. In modern high-performance engines, a change in the ignition point is utilized to increase performance. In conventional reciprocating piston engines, the change in the ignition point is brought about, for example, by activating the spark plugs, via an electronic control system, slightly earlier or later; in other words the change in ignition point is regulated by a change in the time at which the ignition spark is emitted. With the rotating piston engine according to the present invention, on the other hand, this is brought about via a mechanical change in the position of the top dead center point, while the time at which the ignition spark is emitted can remain unchanged.

It is preferred in this context if the cam piece is rotatable steplessly through an angular range of approximately +/−15 degrees.

This feature yields the advantage that the cam piece can be displaced as desired in the clockwise or counterclockwise direction, so that the ignition point of the oscillating-piston engine according to the present invention can be varied.

In a further preferred embodiment, the cam piece is rotatable as a function of the rotation speed of the oscillating-piston engine.

Since it is known that the optimum ignition point depends on the rotation speed of an engine, it is thereby possible, advantageously, to achieve the best performance for the oscillating-piston engine according to the present invention over the entire engine speed range.

In a preferred embodiment, an adjustment mechanism having a worm drive is provided.

A worm drive represents a mechanically simple drive system for the cam piece; the additional advantage achieved is that the worm drive makes possible very fine stepless rotation of the cam piece.

In a further preferred embodiment, the adjustment mechanism is controlled electronically as a function of the rotation speed of the oscillating-piston engine.

With this type of control system for the adjustment mechanism, the rotation speed of the oscillating-piston engine can, for example, be sensed mechanically, a signal being generated which is used for the control system of the adjustment mechanism.

In an alternative preferred exemplifying embodiment, the oscillating-piston engine has multiple spark plugs, arranged in circumferentially spaced fashion, which are respectively variously activated as a function of the rotation speed of the oscillating-piston engine in order to generate an ignition spark.

In this exemplifying embodiment, in contrast to the exemplifying embodiment set forth previously, the ignition point is adjusted by the fact that the multiple spark plugs arranged in circumferentially spaced fashion are variously activated, while the cam piece maintains its position. This embodiment is thus of technically simpler configuration, although no stepless adjustability of the ignition point is possible. There exists only the possibility of bringing about advanced, normal, or retarded ignition, but the advanced or retarded ignition cannot be graduated.

In a further preferred embodiment, the oscillating-piston engine has a fuel injection nozzle which is arranged at a circumferential angle of approximately 25 degrees before the ignition point in the revolution direction of the pistons.

The result of this feature is that injection of the fuel is accomplished, independently of the intake of combustion air, shortly before the ignition point and thus shortly before the top dead center point, which in the case of a nonrotatable cam piece coincides with the ignition point and in the case of a rotatable cam piece, as described earlier, is displaced slightly with respect to the ignition point. The result thereby achieved is that with the oscillating-piston engine according to the present invention as well, it is possible to utilize direct fuel injection according to the GDI (gasoline direct injection) principle in order to increase the efficiency of the oscillating-piston engine according to the present invention and to decrease fuel consumption. Especially in combination with the rotatable embodiment, as described above, of the cam piece for changing the ignition time, the performance of the oscillating-piston engine according to the present invention can be further enhanced.

As an alternative to the above-described embodiment of the oscillating-piston engine according to the present invention having an eccentrically arranged output shaft, it is further preferred if the oscillating-piston engine has an output shaft arranged concentrically with the housing axis.

A concentric arrangement of the output shaft has the advantage, as compared to an eccentric arrangement, that the oscillating-piston engine can be of radially narrower configuration.

It is preferred in this context if the first annular element bears the output shaft centeredly on one outer side, and on the opposite side is joined immovably to the second annular element via the journal rods.

Because of the fact that in this embodiment the annular elements have no external tooth set which meshes with a corresponding tooth set of the output shaft, but rather the output shaft is configured centeredly on one of the annular elements, several different functional elements are combined into modules. This has the advantage that the oscillating-piston engine according to the present invention comprises fewer parts and is thus embodied as a simpler design.

It is further preferred in this context if the cam piece engages into the first annular element which bears the output shaft, and is retained by the latter immovably with respect to the housing.

The advantage of this feature is that the cam piece is stationary with respect to the housing without being directly joined to the housing. Additional parts are eliminated by the fact that the first annular element both bears the output shaft and at the same time holds the cam piece.

In a further preferred embodiment, the annular elements and the journal rods form a cylindrical unit with an axially continuously constant outside diameter.

This design feature has the advantage that the unit constituted by the annular elements, journal rods, and cam piece can be pulled as a unit out of the housing, and also inserted as a unit, since with this embodiment it is also possible to configure the inner housing wall in axially continuous and homogeneous fashion in terms of its inside diameter. This has the advantage that the oscillating-piston engine according to the present invention is easy to assemble and maintain, since the annular elements, journal rods, and cam piece can be preassembled into a unit outside the housing.

Further advantages are evident from the description below of the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An exemplifying embodiment of the oscillating-piston engine according to the present invention is shown in the drawings, in which:

FIG. 11 shows a longitudinal section, corresponding to FIG. 7, of a further exemplifying embodiment of an oscillating-piston engine; and FIG. 12 shows a longitudinal section, corresponding to FIG. 8, of the oscillating-piston engine in FIG. 11.

DETAILED DESCRIPTION OF PREFERRED EMBODIMENTS

FIGS. 1 through 4 depict an oscillating-piston engine 10 in various sectional views.

Figure 2:
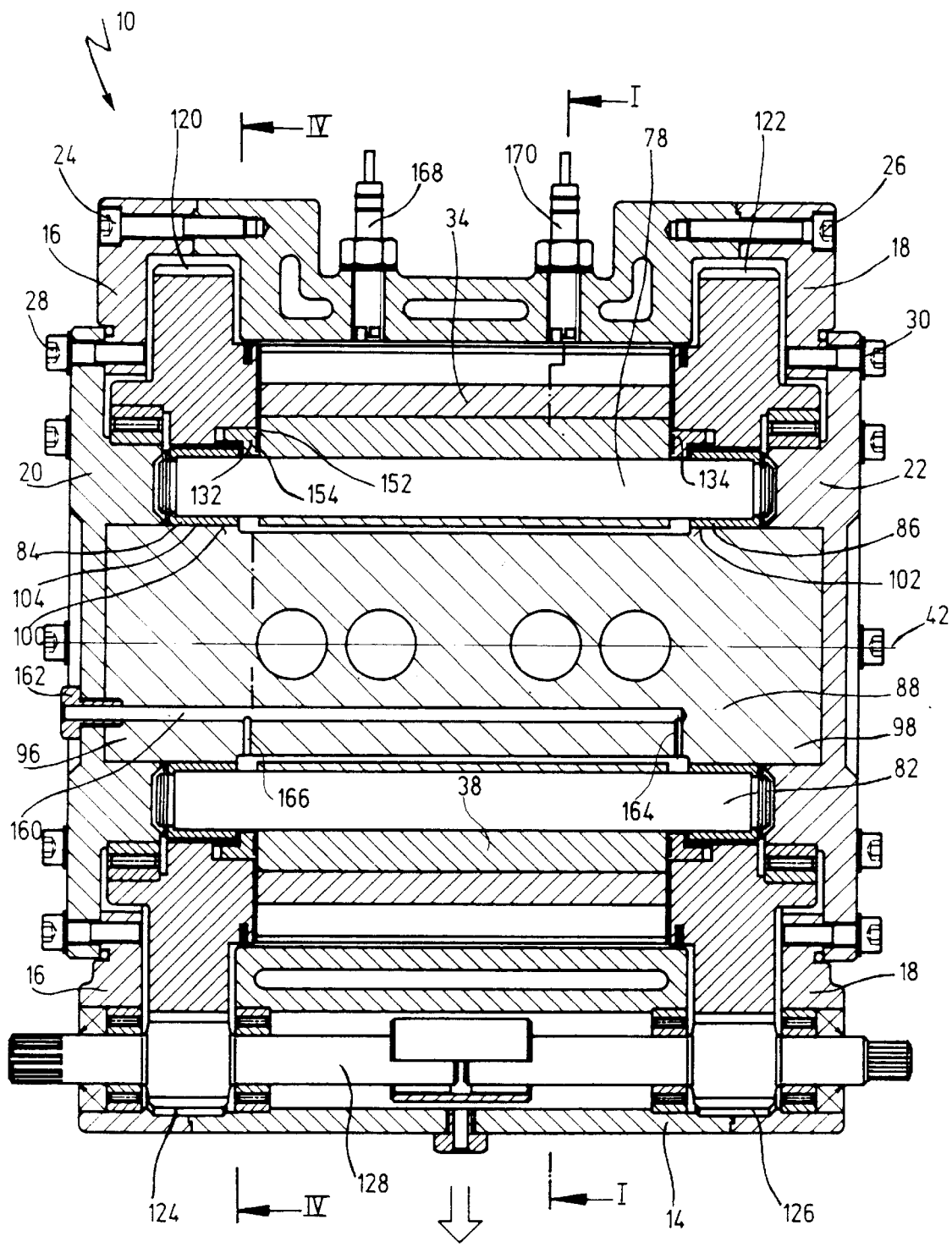
FIG. 2 shows a longitudinal section of the oscillating-piston engine along line II—II of FIG. 1.

Oscillating-piston engine 10 has a housing 12 that is constituted by an axially extending and substantially cylindrical central housing 14, a left annular housing flange 16 adjacent axial thereto, and a right annular housing flange 18, as well as a left housing cover 20 and a right housing cover 22 (see FIG. 2). Left annular housing flange 16 is mounted on central housing part 14 by way of circumferentially distributed bolts 24, and right annular housing flange 18 on central housing part 14 by way of circumferentially distributed bolts 26. Left housing cover 20 is in turn immovably joined to left annular housing flange 16 via bolts 28 that are also distributed circumferentially, and right housing cover 22 is immovably joined to right annular housing flange 18 via bolts 30 that are also distributed circumferentially.

Figure 1:
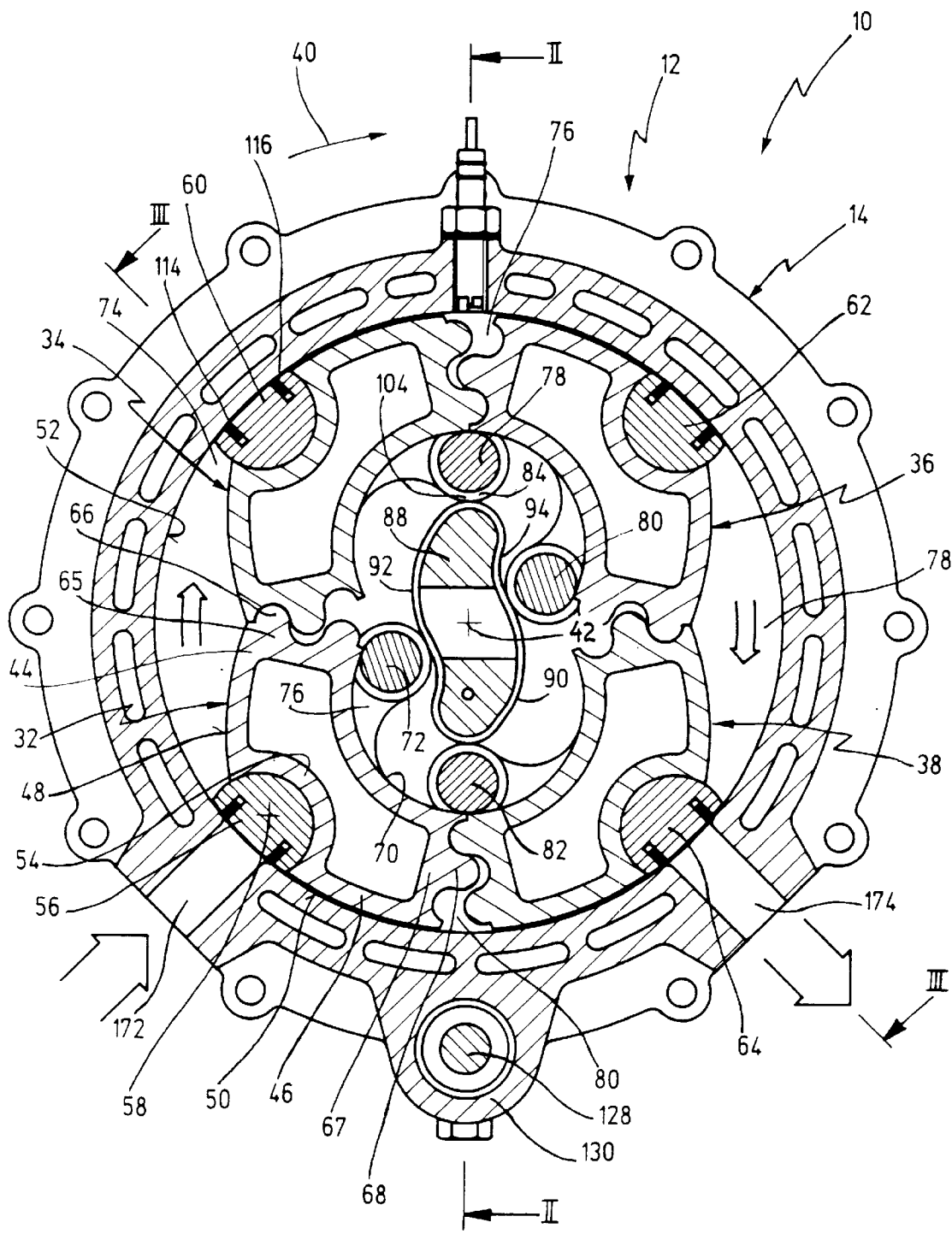
FIG. 1 shows a cross section of an oscillating-piston engine along line I—I of FIG. 2.

Four identical pistons 32, 34, 36, and 38 are arranged in housing 12 (see FIG. 1). Pistons 32, 34, 36, and 38 are movable in a revolution direction 40 about a central housing axis 42, as will be explained further at a later point.

Since pistons 32, 34, 36, and 38 are identical, for reasons of clarity their configuration will be described below in exemplary fashion with reference to piston 32.

Piston 32 is configured as a two-armed lever, and thus has a first lever arm 44 and a second lever arm 46. First lever arm 44 and second lever arm 46 have radially external surfaces 48 and 50, respectively, which have a curvature which corresponds exactly to the curvature of an inner wall 52 of central housing part 14, so that radially external surfaces 48 and 50 can rest in planar contact against inner wall 52.

First lever arm 44 and second lever arm 46 are rigidly and integrally joined to one another via a radially inwardly curved concave segment 54. At concave segment 54, piston 32 is mounted pivotably about a piston axis 58 on a journal rod 56, so that piston 32 can pivot back and forth between two end positions; in rocker fashion, in the one end position radially external surface 50, and in the other end position (as shown) radially external surface 48, rests against inner wall 52. Provided in addition to journal rod 56 are correspondingly identical journal rods 60, 62, and 64 for pistons 34, 36, and 38, on which pistons 34, 36, and 38 are pivotably mounted in similar fashion, although this does not require explanation again here.

The four journal rods 56, 60, 62, and 64 are arranged offset from one another at angles of 90 degrees.

First lever arm 44 of piston 32 furthermore has at its lateral end 65 a tooth set 66 which is constituted by two outwardly projecting teeth that are approximately semicircular in section, and one inwardly directed recess also approximately semicircular in section. Second lever arm 46 has on its lateral end 67 a tooth set 68 which is configured in a manner complementary to tooth set 66.

By way of tooth sets 66 and 68, piston 32 is in sealed rolling engagement with its adjacent pistons 34 and 38 which have corresponding complementary tooth sets. As pistons 32, 34, 36, and 38 pivot, the tooth sets roll within one another and simultaneously have a sealing function. It is also evident that two adjacent pistons 32, 34, 36 and 38 are always executing opposite-direction pivoting movements.

Each two pistons 32, 34, 36, and 38 adjacent to one another delimit four sealed working spaces 74, 76, 78, and 80, whose volumes alternately increase and decrease during the operation of oscillating-piston engine 10 as a result of the pivoting and revolving movements of pistons 32, 34, 36, and 38. For example, working space 74 is delimited by pistons 32 and 34, journal rods 56 and 60, and a corresponding segment of inner wall 52 of central housing part 14; pistons 32, 34, 36, and 38 are also axially sealed as will be described later.

At end 65 of lever arm 44 on a radially inner side 70 of piston 32, an axially extending cylindrical piston rod 72 is immovably joined to piston 32 via a molded-on element 76.

Pistons 34, 36, and 38 have correspondingly mounted piston rods 78, 80, and 82.

Piston rod 78 carries at its two axial ends respective cylindrical rollers 84 and 86 (see FIG. 2), which are each mounted rotatably on piston rod 78. Cylindrical rollers 84 and 86 extend axially over only a partial length of piston rod 78. Identical rollers are provided similarly on piston rods 74, 80, and 82.

Also arranged centrally in housing 12 is an axially extending cam piece 88 which is joined respectively to left housing cover 20 and right housing cover 22 immovably with respect to the housing (see FIGS. 1 and 2). Cam piece 88 has an outer contour 90 which has convex segments 92 and concave segments 94 alternating with one another in the revolution direction.

Figure 3:
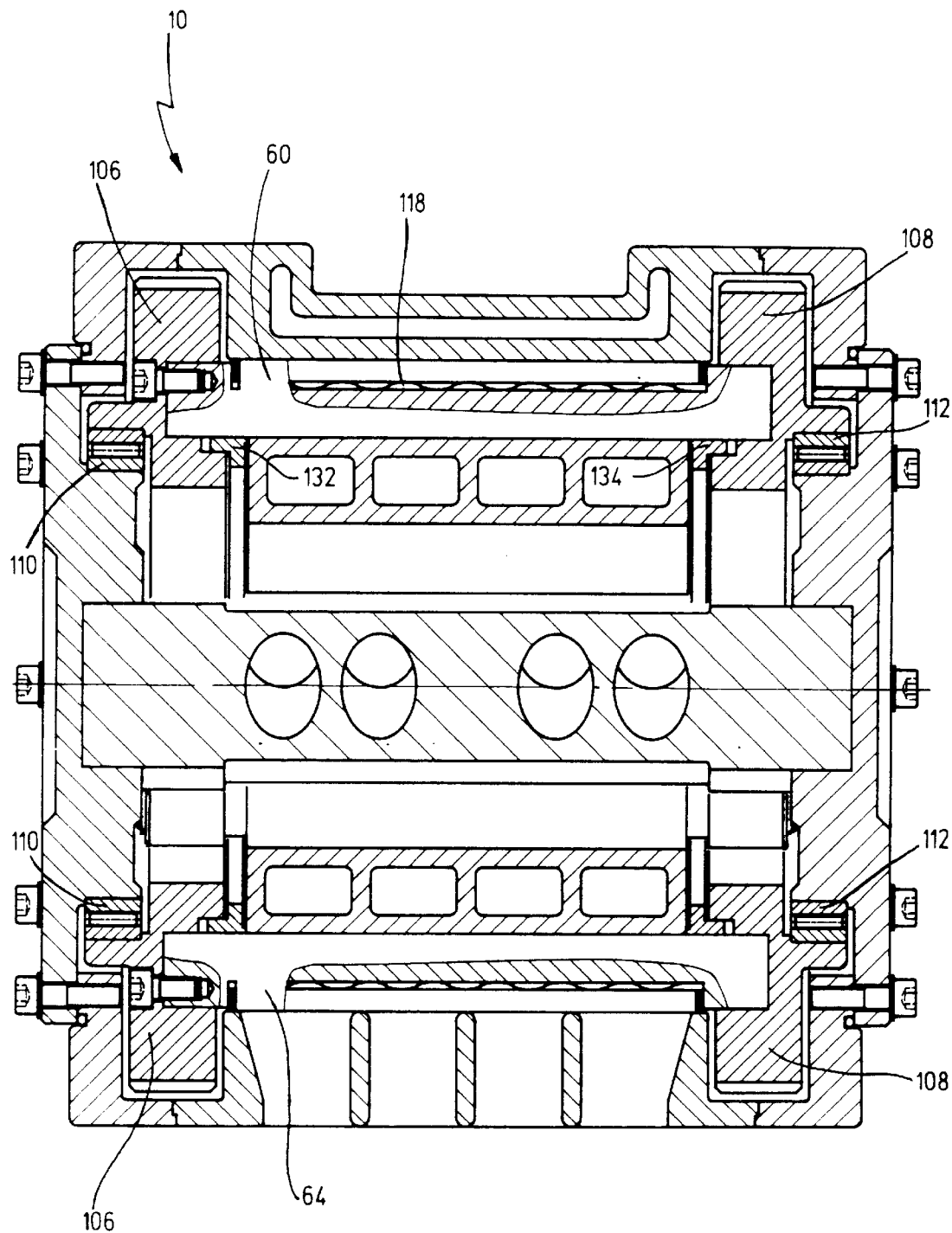
FIG. 3 shows a longitudinal section of the oscillating-piston engine along line III—III of FIG. 1.

It is evident from FIGS. 2 and 3 that cam piece 88 has axial end regions 96 and 98 which extend over a partial axial length of cam piece 88 and are radially thicker than the central region of cam piece 88. Axial end regions 96 and 98 form that circumferential part of outer contour 90 of cam piece 88 on which the cylindrical rollers 84 and 86 of piston 34, and the corresponding rollers of pistons 32, 36, and 38, roll while revolving about housing axis 42. Surfaces of rollers 84 and 86 thus form running surfaces 100 and 102, respectively, of piston 34 which run along outer contour 90 of cam piece 88; running surfaces 100 and 102 are in continuous contact with outer contour 90 in the axial end regions 96 and 98 of cam piece 88 during the revolution of piston 34, so that piston 34 is uninterruptedly guided during its revolution around cam piece 88. The same once again applies to the other pistons 32, 36, and 38.

One semidiameter of cylindrical rollers 84 and 86 is smaller than the curved region of concave regions 94 of axial cam piece 88.

The outer contour of cam piece 88 corresponds exactly to the trajectory described by a point (designated 104) on running surface 100 located closest to housing axis 42; the trajectory of point 104 results from the superposition of the pivoting movement and revolving movement of pistons 32, 34, 36, and 38 during one full revolution about housing axis 42.

It is apparent from FIG. 3 that journal rods 60 and 64 (as well as journal rods 56 and 62 which are not visible in FIG. 3) are respectively immovably joined at their axial ends to an annular element 106 and an annular element 108, annular elements 106 and 108 being mounted in housing 12 rotatably in revolution direction 40 on bearing rings 110 and 112. Journal rods 56, 60, 62, and 64 and annular elements 106 and 108 form a cage that is rotatable in housing 12; as this cage revolves, journal rods 56, 60, 62, and 64 carry pistons 32, 34, 36, and 38 with them.

As they revolve, journal rods 56, 60, 62, and 64 rest directly against inner wall 52 of central housing part 14. For this purpose, journal rods 56, 60, 62, and 64 possess a small radial clearance, so that seals 114 and 116 embedded in journal rods 56, 60, 62, and 64 are pressed radially outward against inner wall 52 of central housing part 14 by the resulting centrifugal forces. To guarantee sufficient sealing with respect to inner wall 52 even at low rotation speeds or when oscillating-piston engine 10 is at a standstill, corrugated springs 118, which press seals 114, 116 radially outward even with the machine at a standstill, are provided in journal rods 56, 60, 62, and 64.

Annular elements 106 and 108 have respective external tooth sets 120 and 122, arranged circumferentially on them, which mesh with corresponding external tooth sets 124 and 126 of an output shaft 126, running parallel to housing axis 42 and arranged eccentrically with respect thereto, which is mounted in a bulge 130 of housing 12. The rotary movement of annular elements 106 and 108 is thus converted into a rotary movement of output shaft 128. Output shaft 128 can, for example, be joined to a transmission (not shown here) of a motor vehicle.

Pistons 32, 34, 36, and 38 are each sealed externally in the axial direction by a seal 132 and 134.

Figure 4:
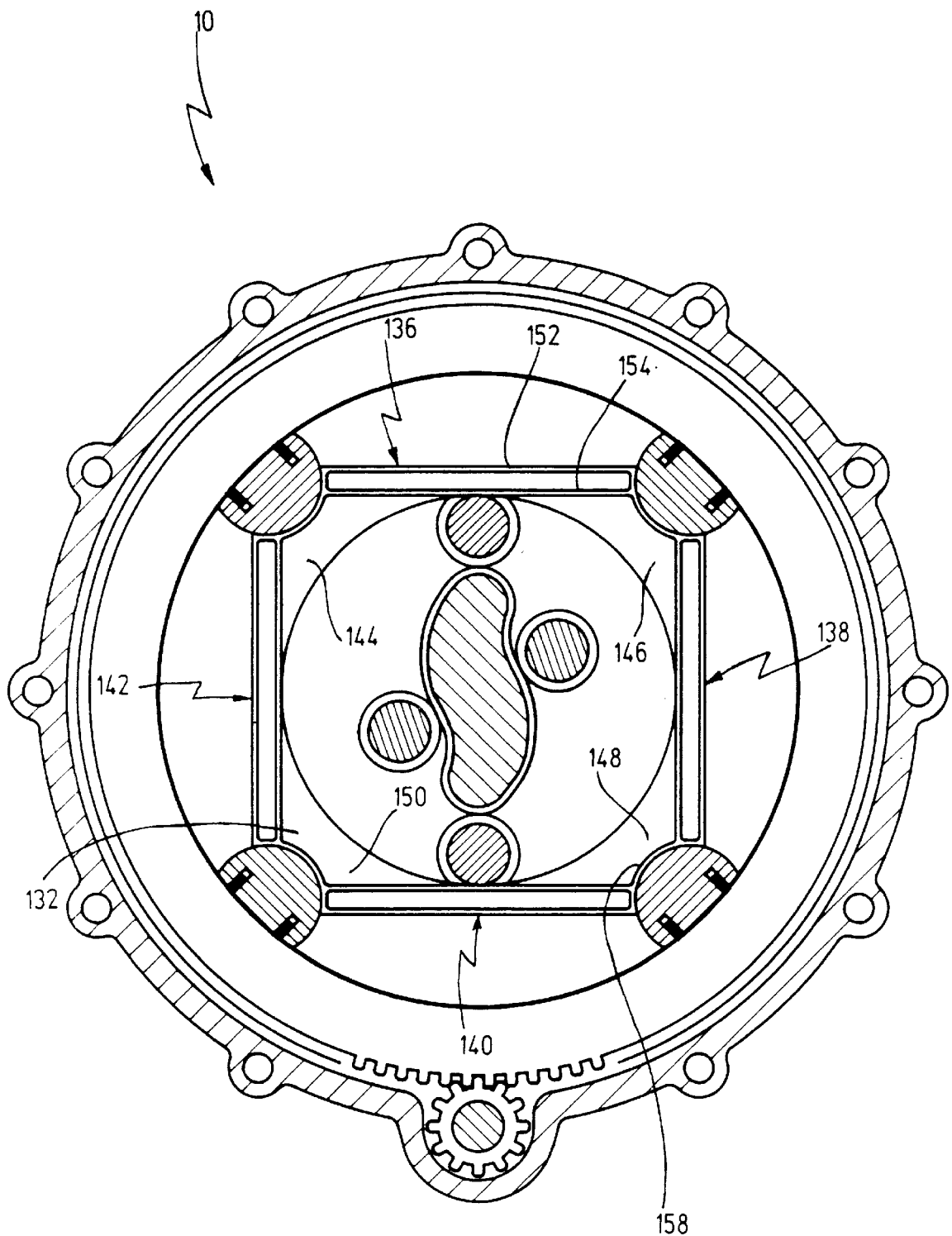
FIG. 4 shows a cross section of the oscillating-piston engine along line IV—IV of FIG. 2.

In FIG. 4, seal 132 is visible in a plan view. Seal 132 has four radially external segments 136, 138, 140, and 142, arranged at right angles to one another and running in a straight line, which are integrally connected to one another by connecting segments 144, 146, 148, and 150.

Each of external segments 136, 138, 140, 142 has two axially inwardly projecting sealing ridges 152 and 154, as indicated here in exemplary fashion for segment 136, which rest sealingly against the lateral axial ends of pistons 32, 34, 36, and 38. Outer segment 136 and the other segments 138, 140, and 142 are recessed axially outward between sealing ridges 152 and 154. Connecting segment 148 has a sealing ridge 158 curved in accordance with journal rod 62, identical sealing ridges being provided on connecting segments 144, 146, and 150. Seal 132 furthermore has an axially outwardly extending segment 156 which is embedded into corresponding recesses in annular element 106 (see FIG. 2).

Seal 132 (and the same applies correspondingly for seal 134 arranged in mirror-image fashion with respect to it) rests with sealing ridges 152 and 154 and the corresponding sealing ridges of the other segments 138, 140, and 142, and with sealing ridge 158 and the sealing ridges of the other connecting segments 144, 146, 148 and 150, sealingly against pistons 32, 34, 36, and 38.

It is evident from FIG. 2 that there is provided in cam piece 88 a conduit 160 which is provided for the reception and conveyance of liquid lubricants, such as motor oil, which can be introduced through an inlet screw 162 and can pass through further conduits 164 and 166 into the central interior of housing 12 in order to lubricate running surfaces 100 and 102 of piston 34 and the other running surfaces of the other pistons 32, 36, and 38, as well as outer contour 90 of cam piece 88 that is in contact with them.

Figure 5A:
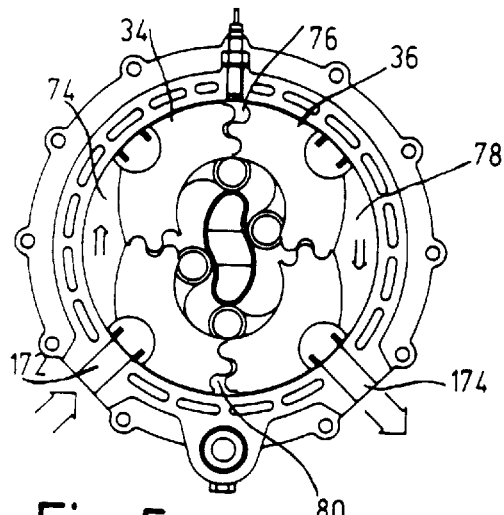
FIG. 5a, FIG. 5b, FIG. 5c, FIG. 5d, FIG. 5e show cross sections of the oscillating-piston engine, corresponding to FIG. 1, in five working positions which succeed one another at intervals of 22.5 degrees.

Oscillating-piston engine 10 moreover has two spark plugs 168 and 170 which are recessed into central housing part 14. Also provided in housing 12 is a radially extending intake conduit 172 for the admission of a fuel/air mixture, which encloses an angle of approximately 135 degrees with the position of spark plugs 168 and 170. Additionally provided in housing 12 is an exhaust conduit 174 through which combusted mixture can be discharged. Exhaust conduit 174 also encloses an angle of approximately 135 degrees with spark plugs 168 and 170. In FIGS. 5a) through e), the operation of oscillating-piston engine 10 shown in FIGS. 1 through 4 is shown as a four-cycle gasoline engine. FIG. 5a) corresponds to FIG. 1, and shows the position of pistons 32, 34, 36, and 38 at the ignition point, which is also referred to as the top dead center point. All four pistons 32, 34, 36, and 38 are in one of their pivoted positions. Intake conduit 172 is sealedly closed by journal rod 56, while exhaust conduit 174 is also sealedly closed by journal rod 64. Working chamber 74 contains fuel/air mixture previously drawn in through intake conduit 172, working chamber 76 contains maximally compressed fuel/air mixture that is ignited by spark plugs 168 and 170, and working chamber 78 contains expanding combusted fuel/air mixture, while combusted fuel/air mixture has already been discharged from working chamber 80 through exhaust conduit 174.

Figure 5B:
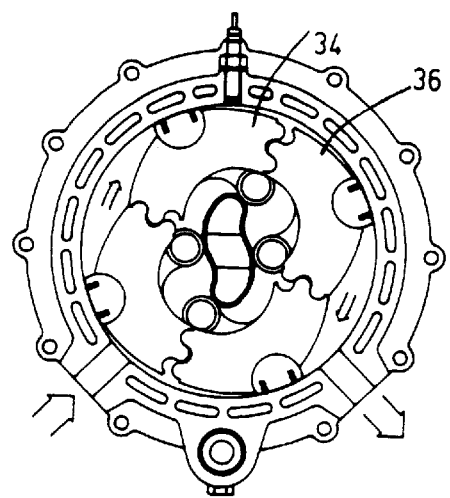
Figure 5C:
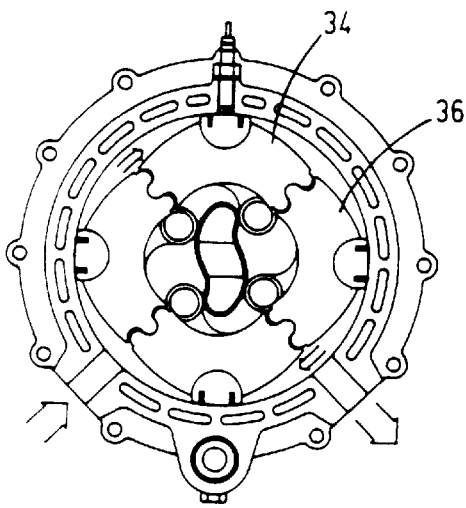

In FIG. 5b), pistons 32, 34, 36, and 38 have moved 22.5 degrees further in revolution direction 40. During this movement in revolution direction 40, piston 34 has been guided with its running surfaces 100 and 102, together with the other pistons 32, 36, and 38, along outer contour 90 of cam piece 88 in continual contact therewith. Because of the shape of the outer contour, the four pistons 32, 34, 36, and 38 have been pivoted about their respective piston axis 58 in defined fashion out of their end position shown in FIG. 5a). Working space 76 has accordingly enlarged somewhat, so that the just-ignited fuel/air mixture located therein can expand. At the same time, working space 78 has become somewhat smaller so that the combustion products contained therein can be discharged through exhaust conduit 166 which is now uncovered by journal rod 64. Fresh fuel/air mixture is admitted through intake conduit 172 into working space 74, while the fuel/air mixture previously admitted into working space 74 is now compressed by a corresponding pivoting movement of pistons 32 and 34. In FIG. 5c), pistons 32, 34, 36, and 38 have moved further, by a total of 45 degrees from the initial position shown in FIG. 5a). With pistons 32, 34, 36, and 38 in this position, working chambers 74, 76, 78, and 80 are of approximately equal size. Running surface 100 of piston 34 and the running surfaces of the other pistons 32, 36, and 38 have rolled further along outer contour 90 of cam piece 88, still in continuous contact therewith. Each of pistons 32, 34, 36, and 38 is now in a pivoted position which corresponds approximately to the midpoint between the two possible end positions of pistons 32, 34, 36, and 38.

Figure 5D:
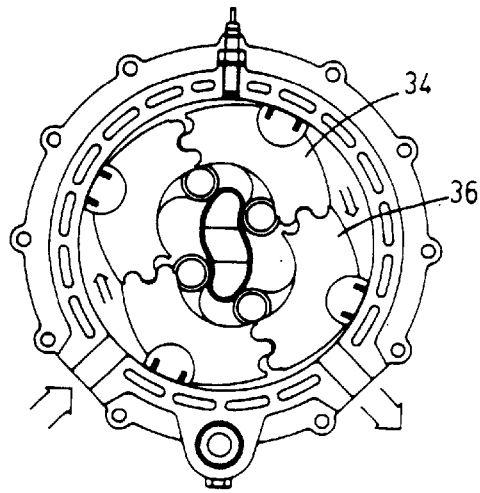

In FIG. 5d), pistons 30, 32, 34, 36 have moved further, by a total of 67.5 degrees in revolution direction 40. The fuel/air mixture present in chamber 74 is being further compressed by a corresponding pivoting movement of pistons 34 and 36, while the ignited fuel/air mixture in chamber 76 is expanding further. The combusted fuel/air mixture previously contained in chamber 78 has now been almost completely discharged from exhaust conduit 166, while chamber 80 has reached almost its maximum volume and is almost entirely filled with fresh fuel/air mixture through intake conduit 172.

Figure 5E:
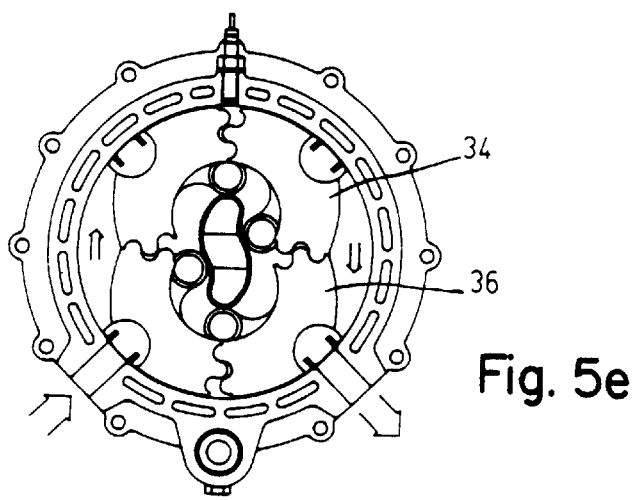

In FIG. 5e), pistons 32, 34, 36, 38 have moved further, by a total of 90 degrees, a position now having been reached which is indistinguishable from the position shown in FIG. 5a).

It is apparent from the movement sequences shown in FIGS. 5a) through 5e) that the pivoting movements of the individual pistons 32, 34, 36 and 38 are exactly controlled by the fact that all the running surfaces 100 and 102 of pistons 32, 34, 36 and 38 run along outer contour 90 of cam piece 88 in continuous contact therewith.

In one full revolution of pistons 32, 34, 36, and 38 through 360 degrees, four complete four-stroke cycles take place.

FIGS. 6 through 9 depict a further exemplary embodiment of an oscillating-piston engine labeled with the general reference character 10'.

The individual elements of oscillating-piston engine 10' are identical to those of oscillating-piston engine 10 in FIGS. 1 through 5, with the exception of the features described below. The operation of oscillating-piston engine 10' also corresponds in principle to the operation of oscillating-piston engine 10 according to FIG. 5.

Figure 6:
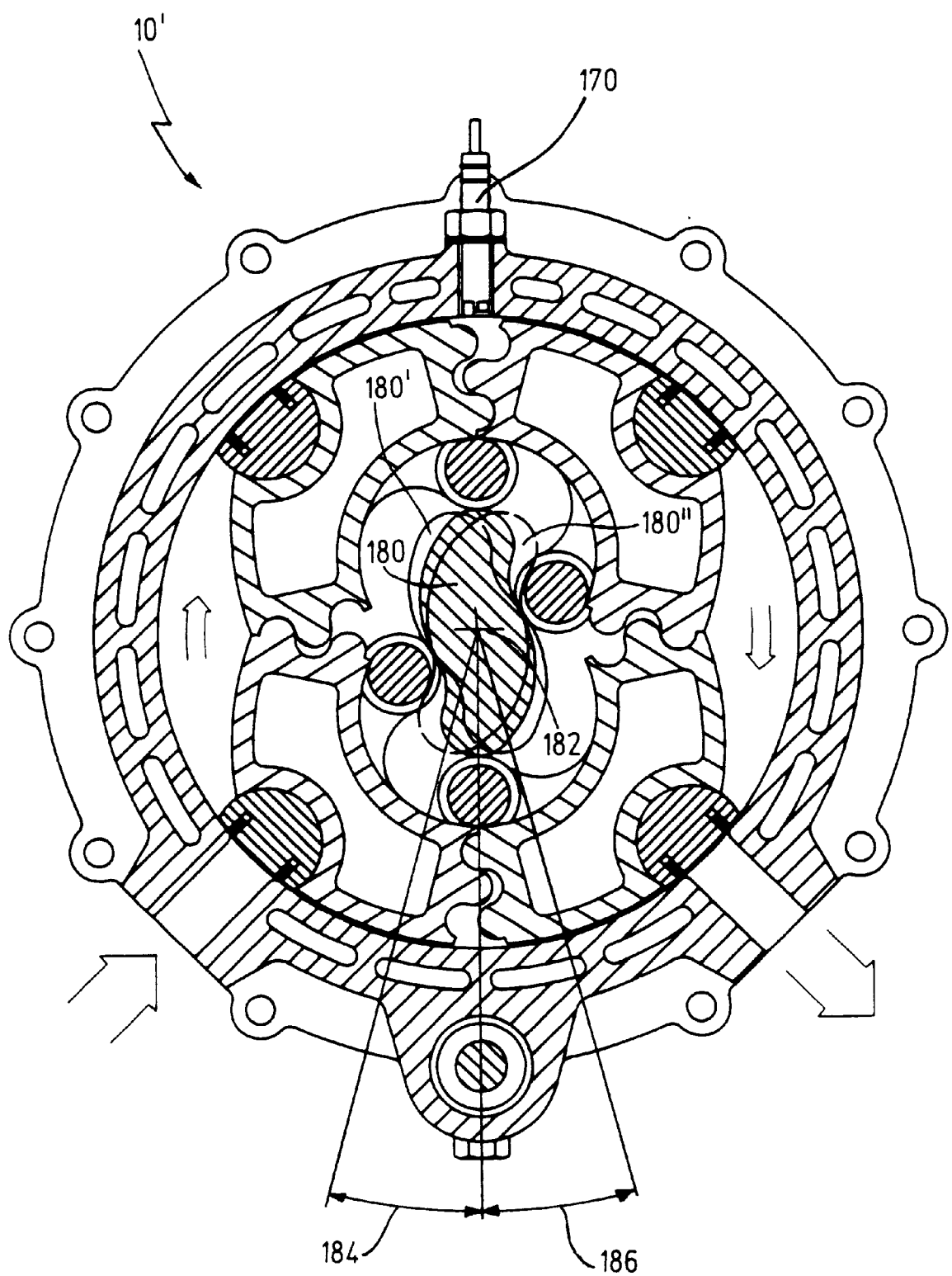
FIG. 6 shows a cross section, corresponding to FIG. 1, of a further exemplifying embodiment of an oscillating-piston engine.

In contrast to oscillating-piston engine 10, oscillating-piston engine 10' in FIG. 6 has a cam piece 180 which is mounted rotatably about a housing axis 182 such that it can be locked in a rotated position. Except for the rotation capability, cam piece 180, like cam piece 88 in FIGS. 1 through 5, is to be regarded as stationary. Cam piece 180 is rotatable clockwise through an angular range 184 and counterclockwise through an angular range 186. Angular range 184 extends from 0 to approximately +15 degrees, while angular range 186 extends from 0 to approximately –15 degrees. Within the two angular ranges 184 and 186, cam piece 180 can steplessly assume any position and can be locked in that position.

FIG. 6 depicts, by way of example, three positions of cam piece 180. The normal position of cam piece 180 is shown with cross-hatching. In this position, in which cam piece 180 is not rotated (0 degrees), ignition of the fuel/air mixture occurs precisely when oscillating-piston engine 10' is at its top dead center (TDC) point.

Reference number 180' designates a position of cam piece 180 in which cam piece 180 has been rotated counterclockwise from its 0-degree position through an angle of between 0 and –15 degrees. The result of this is that the top dead center point of oscillating-piston engine 10' is displaced forward and counterclockwise with respect to the stationary spark plug 170. Assuming that spark plug 170 emits an ignition spark at the same time as in the case of the 0-degree position, the forward displacement of the top dead center point with respect to spark plug 170 results in retarded ignition.

The reference number 180" correspondingly depicts a position of cam piece 180 in which cam piece 180 has been rotated clockwise through an angle of between 0 and +15 degrees. Using the same assumption as before, this results in advanced ignition for oscillating-piston engine 10'.

It is understood that when it reaches each angular position, cam piece 180 is immobilized in that position so as to ensure that the pistons run without difficulty along cam piece 180.

The rotation of cam piece 180 is accomplished as a function of the rotation speed of the oscillating-piston engine, as required to achieve the best performance for oscillating-piston engine 10'.

Figure 7:
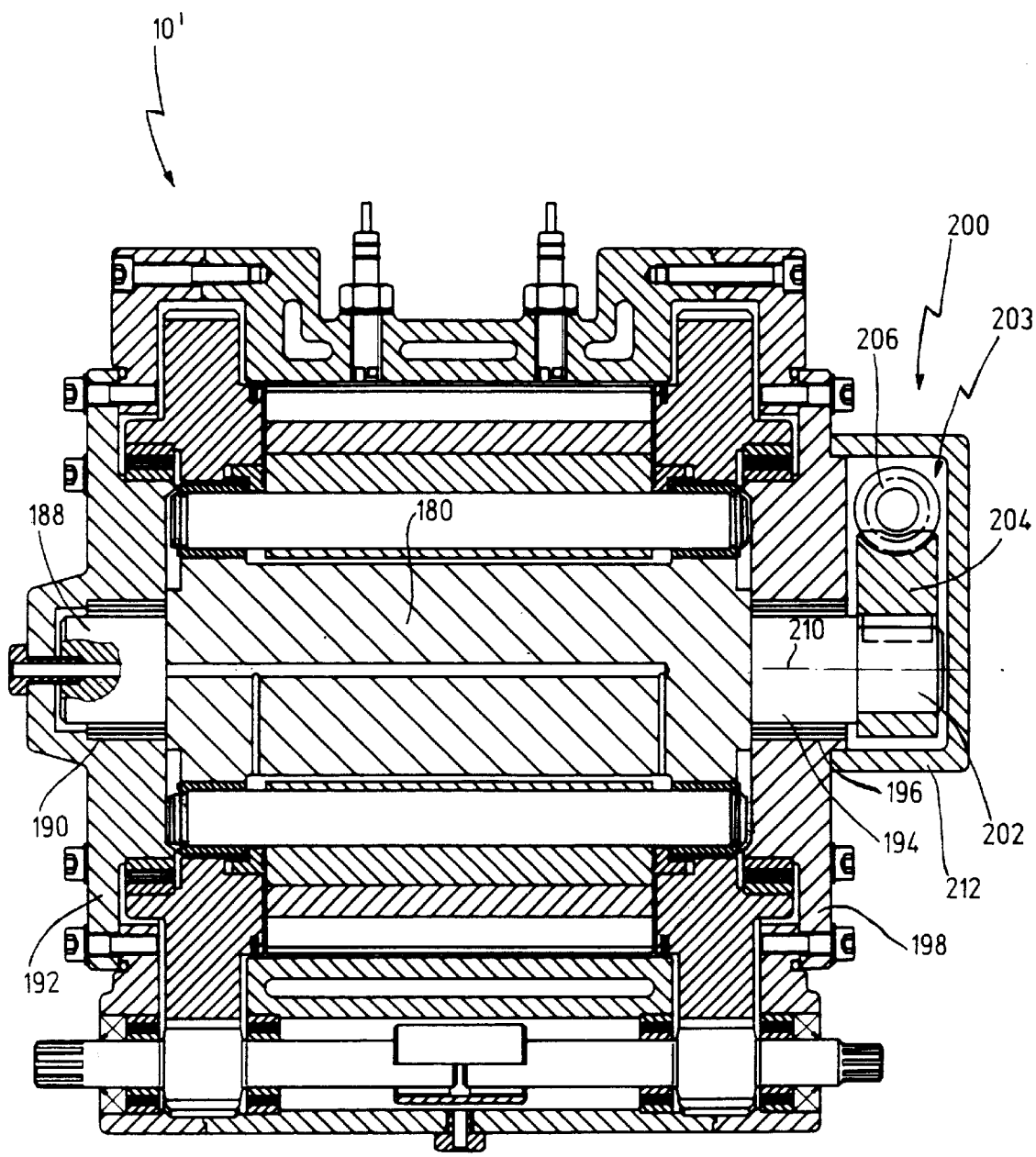
FIG. 7 shows a longitudinal section, corresponding to FIG. 2, of the oscillating-piston engine in FIG. 6.
Figure 8:
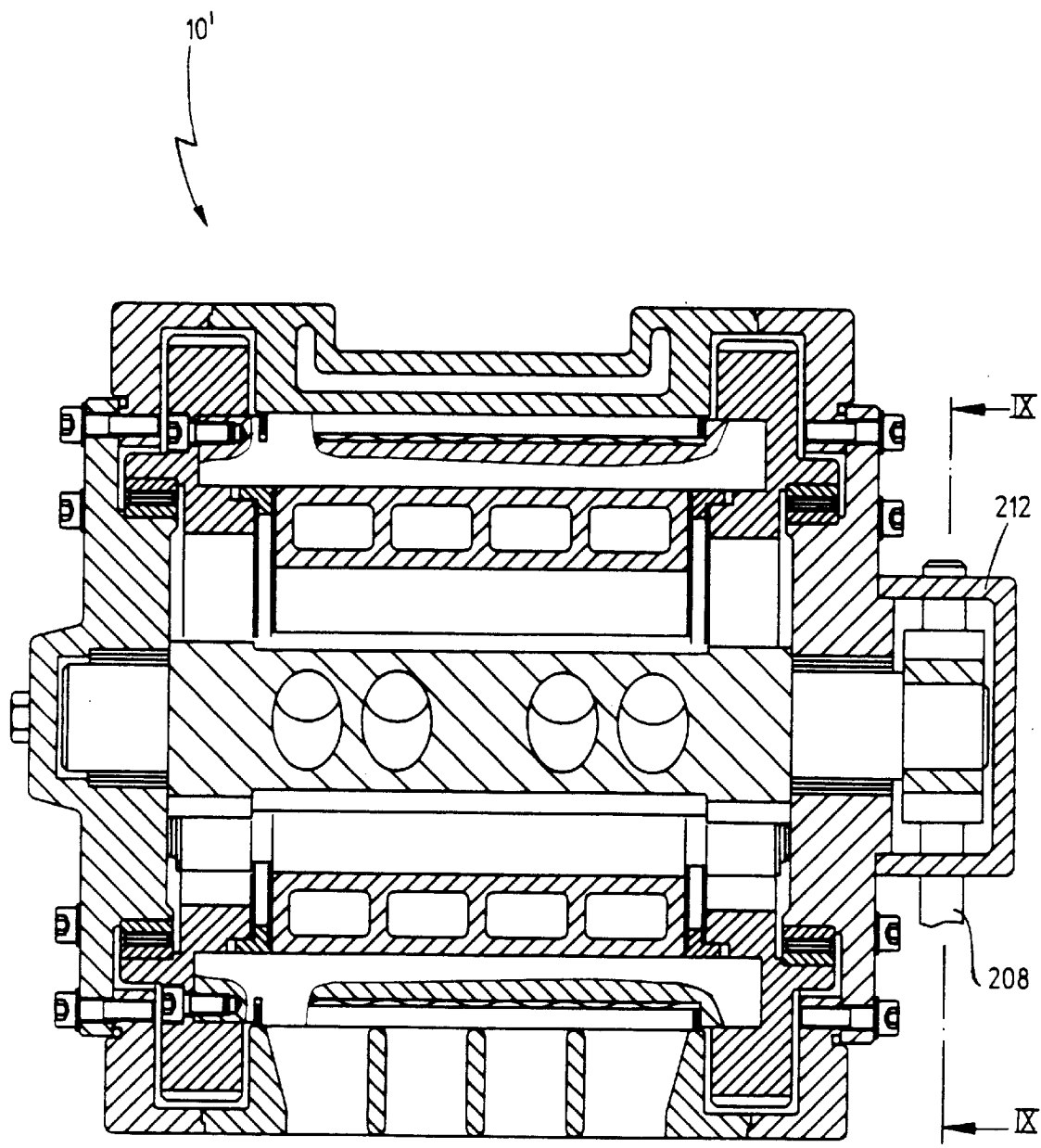
FIG. 8 shows a longitudinal section, corresponding to FIG. 3, of the oscillating-piston engine in FIG. 6.

Details of the rotatability of cam piece 180 will now be explained in more detail with reference to FIGS. 7 through 9.

Cam piece 180 has at its left end a shaft 188 which is mounted rotatably in a hub 190 of a left housing cover 192.

Cam piece 180 also has at its right end a shaft 194 which is again rotatably mounted in a hub 196 of a right housing cover 198.

Oscillating-piston engine 10' furthermore has an adjustment mechanism labeled with the general reference character 200. Adjustment mechanism 200 has a worm drive 203. Worm drive 203 is constituted by a worm gear 206 as driving gear and a gear 204 joined to an outer end 202 of shaft 194. Worm gear 206 and gear 204 are in meshing engagement with one another.

Worm gear 206 has a pivot shaft 208 which is arranged perpendicular to longitudinal axis 210 of cam piece 180 and to shaft 94.

Adjustment mechanism 200 is closed off by a cover 212.

Figure 9:
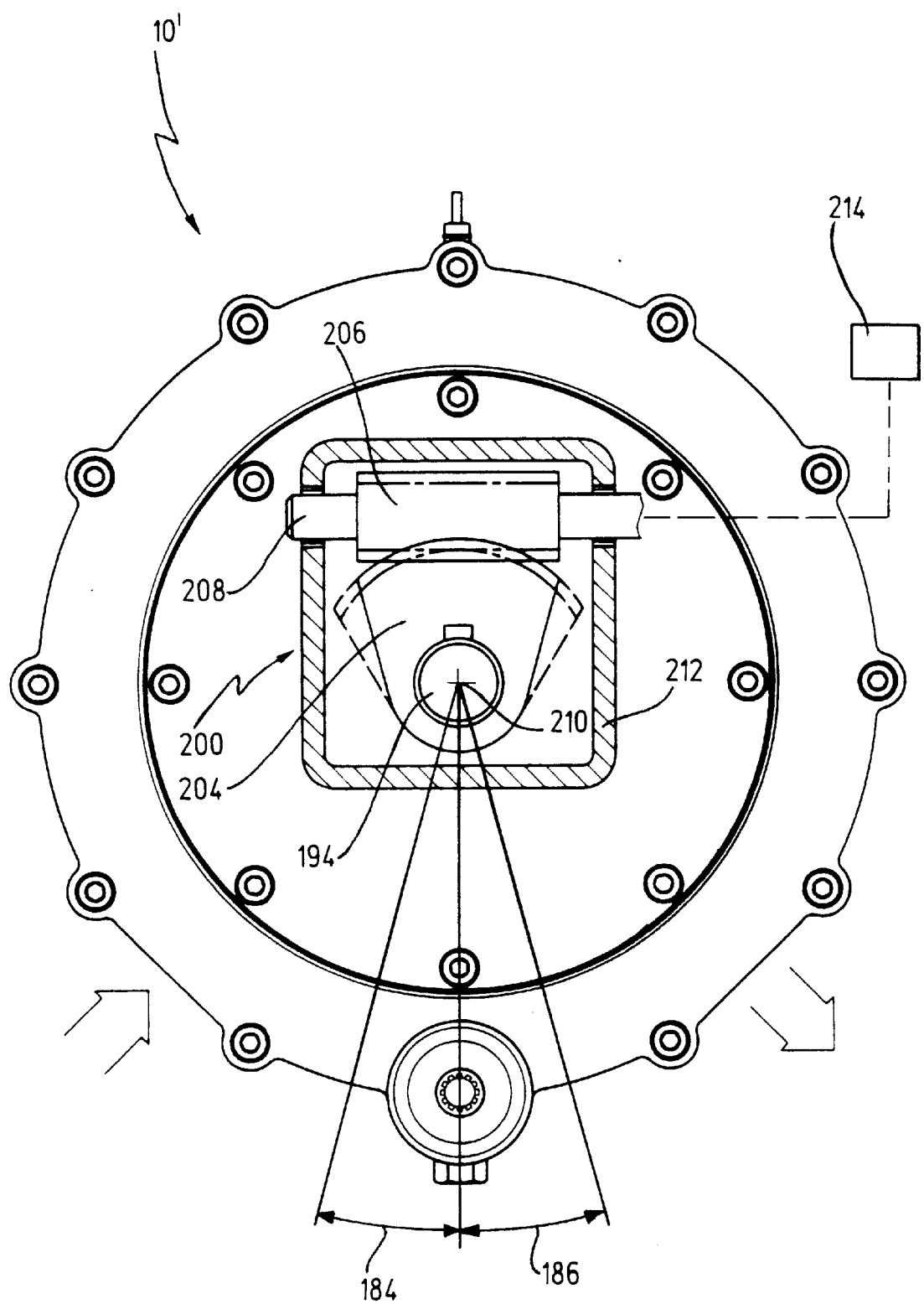
FIG. 9 shows a cross section of the oscillating-piston engine along line IX—IX in FIG. 8.

In FIG. 9, 214 schematically depicts a drive system which causes worm gear 206 to rotate forward and backward in order to adjust cam piece 180. Drive system 214 is moreover self-immobilizing in order to ensure that cam piece 180 is locked by worm drive 203.

Drive system 214 is controlled electronically as a function of the rotation speed of oscillating-piston engine 10', so as to allow, as described earlier, advanced or retarded ignition events as a function of the rotation speed of oscillating-piston engine 10'.

In an embodiment not shown here, provision is made, instead of the rotatability of cam piece 180, for the provision of multiple spark plugs in a manner distributed over the circumference of oscillating-piston engine 10, i.e. to the left and right of spark plug 170 in FIG. 1. With this embodiment, advanced or retarded ignition is achieved by various activation of the respective spark plugs in order to generate an ignition spark. For advanced ignition, the ignition spark necessary for ignition of the fuel/air mixture is emitted by the spark plug arranged on the left side of spark plug 170, and for retarded ignition, correspondingly, by the spark plug arranged on the right side of spark plug 170. This embodiment also makes possible speed-dependent advanced or retarded ignition.

Figure 10:
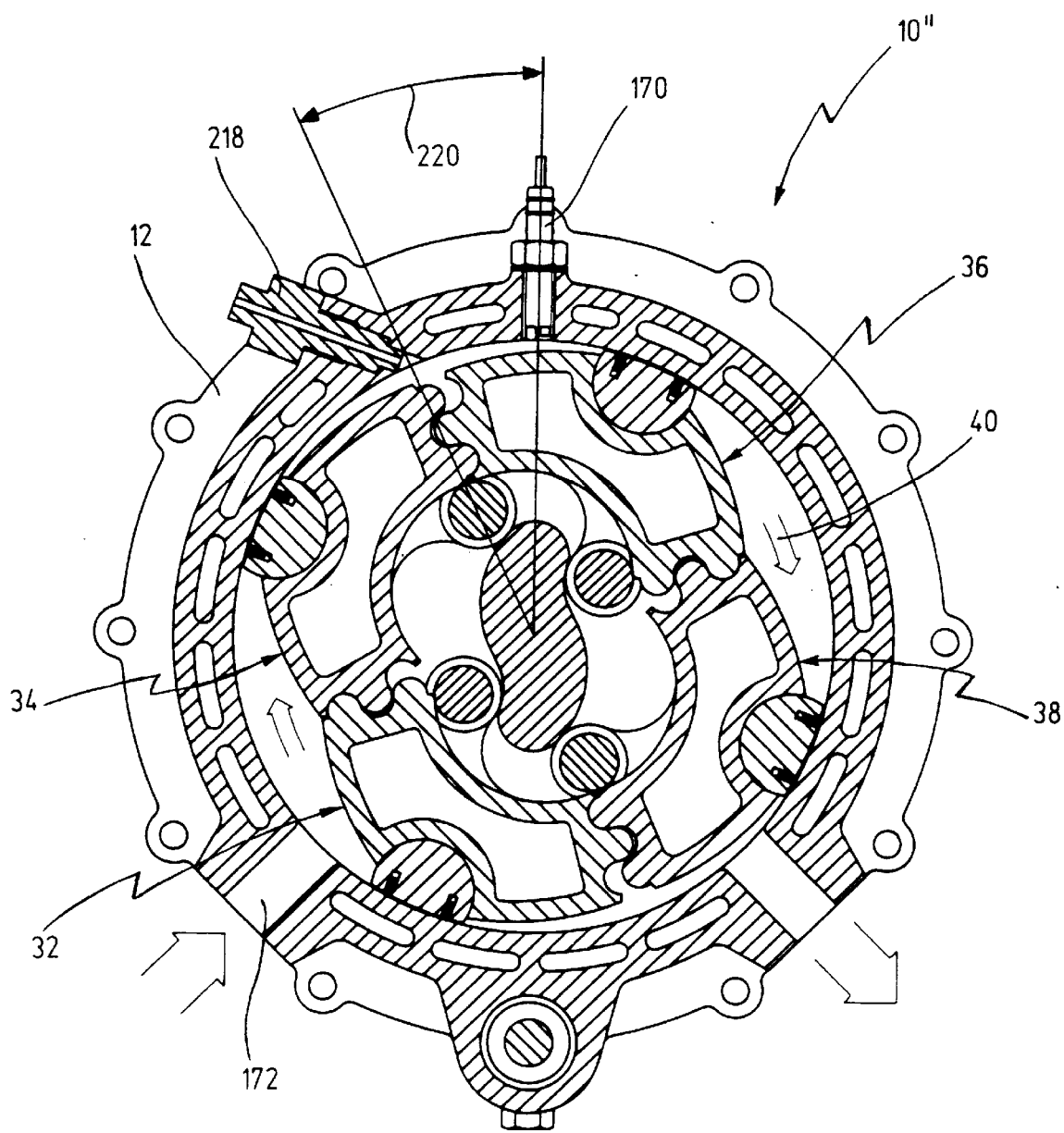
FIG. 10 shows a cross section, corresponding to FIG. 6, of a further exemplifying embodiment of an oscillating-piston engine.

FIG. 10 depicts a further exemplifying embodiment of an oscillating-piston engine labeled with the general reference character 10".

In contrast to oscillating-piston engines 10 and 10' described previously, oscillating-piston engine 10" has a fuel injection nozzle 218. Fuel injection nozzle 218 is arranged in housing 12 before (in revolution direction 40 of pistons 32, 34, 36, 38) the ignition point constituted by spark plug 170, specifically at a circumferential angle 220 of approximately 25 degrees.

In the case of oscillating-piston engine 10", only combustion air is drawn in through intake conduit 172, while fuel is injected through fuel injection nozzle 218. The fuel injected through the fuel injection nozzle is rotated by the piston rotation in front of spark plug 170, where it is ideally ignited.

Oscillating-piston engine 10" is otherwise identical in configuration to oscillating-piston engine 10 with a nonrotatable cam piece 88, or to oscillating-piston engine 10' with a rotatable cam piece 180 for changing the ignition point.

FIGS. 11 and 12 show a further exemplifying embodiment of an oscillating-piston engine labeled with the general reference character 230, which differs from oscillating-piston engines 10, 10', and 10" in terms of the geometry of individual components. In terms of its functional principle, however, oscillating-piston engine 230 corresponds to oscillating-piston engines 10, 10', or 10" described previously.

Oscillating-piston engine 230 has an output shaft 232 which is arranged concentrically with housing axis 234. Output shaft 232 is configured on one outer side of a first annular element 236 as a shaft flange. First annular element 236 is immovably joined to a second annular element 242 via four journal rods 238, 240 equally distributed circumferentially (see FIG. 12).

Annular elements 236 and 242 and the four journal rods 238, 240 form a unit whose outside diameter is continuously axially constant. As in the case of the previous exemplifying embodiments, journal rods 238, 240 serve as bearings for the pivoting pistons; this will not be discussed further at this point.

This unit made up of annular elements 236, 242 and journal rods 238, 240 is received in a housing 244 that is constituted by two axially terminating housing covers 246 and 248 and a cylindrical housing part 250, cylindrical housing part 250 having a circular inner wall with a continuously constant cross section. The inner housing wall is, in other words, homogeneous throughout in terms of its diameter.

First annular element 236 is mounted via a bearing ring 252, and second annular element 242 via a bearing ring 254, rotatably in housing 244.

In addition, a cam piece 256 engages via a shaft flange 258 into first annular element 236 and is mounted so as to rest therein, annular element 236 rotating about cam piece 256 via a bearing ring 260.

Cam piece 256 is rotatable by way of an adjustment mechanism 262 in order to adjust the ignition point; adjustment mechanism 262 corresponds in its configuration and function to adjustment mechanism 200 in FIGS. 6 through 9.

The module made up of first annular element 236 with output shaft 233, journal rods 238, 240, and cam piece 256 can be pulled out of housing 244 as a unit after-housing cover 246 is opened. Conversely, this module can be preassembled outside housing 244 and inserted as a unit into housing 244.

What is claimed, is:

1. An oscillating-piston engine, comprising:
   a housing having a circular inner wall and a central housing axis;
   several pistons configured as two-armed levers, each two adjacent pistons of said pistons being in rolling engagement with one another, wherein said pistons are movable together in a revolution direction;
   several piston axes parallel to said housing axis, each of said pistons arranged pivotably about one of said piston axes, respectively, wherein said piston axes revolve about said housing axis on a circular track concentric with said inner wall of said housing;
   a cam piece arranged centrally in said housing, said cam piece having an outer contour;
   said pistons having running surfaces being configured on sides of said pistons facing said cam piece, wherein said running surfaces, as said pistons revolve in said housing, are guided in constant contact with said outer contour in such a way that the pivoting movements of said pistons during revolution are controlled, regardless of the revolution speed, exclusively by the guidance of said pistons along said outer contour of said cam piece in coaction with the rolling engagement.

2. The oscillating-piston engine of claim 1, wherein said outer contour of said cam piece corresponds exactly to the trajectory, during one complete revolution of said pistons, of a point on said running surfaces located closest to said housing axis, said trajectory resulting from the superposition of the pivoting and revolving movements of said pistons during one full revolution.

3. The oscillating-piston engine of claim 1, wherein said cam piece extends axially over approximately the entire length of said housing, but said running surfaces of said pistons and said outer contour of said cam piece are in contact only in axially limited regions.

4. The oscillating-piston engine of claim 1, wherein said running surfaces are arranged at one end of one of two lever arms of said pistons.

5. The oscillating-piston engine of claim 1, wherein said running surfaces of said pistons are surfaces of rollers mounted rotatably on said pistons.

6. The oscillating-piston engine of claim 5, wherein said rollers are cylindrical and have a semidiameter which is less than the radius of curvature of concave segments of said cam piece.

7. The oscillating-piston engine of claim 1, wherein said running surfaces are surfaces of piston-mounted sliding elements.

8. The oscillating-piston engine of claim 7, wherein said running surfaces are of partially circular configuration at least in the regions which are in contact with said outer contour of said cam piece.

9. The oscillating-piston engine of claim 1, wherein said pistons are each mounted on an axially extending journal rod, said journal rods being joined at their ends to respective annular elements that are movable in said revolution direction.

10. The oscillating-piston engine of claim 9, wherein at least one of said annular elements has an external tooth set which meshes with a corresponding external tooth set of an output shaft running parallel to the housing axis and arranged eccentrically with it.

11. The oscillating-piston engine of claim 1, wherein said pistons are axially externally sealed at their axial ends by a seal which has multiple axially inwardly projecting sealing ridges which rest sealingly against the pistons.

12. The oscillating-piston engine of claim 1, wherein said cam piece is rotatable about said housing axis in order to change the ignition point, and can be locked in a rotated position.

13. The oscillating-piston engine of claim 12, wherein said cam piece is rotatable steplessly through an angular range of approximately ±15 degrees.

14. The oscillating-piston engine of claim 13, wherein said cam piece is rotatable as a function of the rotation speed of said oscillating-piston engine.

15. The oscillating-piston engine of claim 1, wherein said cam piece is rotatable about said housing axis, and said cam piece is rotatable as a function of the rotation speed of said oscillating-piston engine.

16. The oscillating-piston engine of claim 1, wherein said cam piece is rotatable about said housing axis, and an adjustment mechanism for said cam piece having a worm drive is provided.

17. The oscillating-piston engine of claim 16, wherein said adjustment mechanism is controlled electronically as a function of the rotation speed of said oscillating-piston engine.

18. The oscillating-piston engine of claim 1, wherein said oscillating-piston engine comprises multiple spark plugs, arranged in circumferentially spaced fashion, which are respectively variously activated as a function of the rotation speed of said oscillating-piston engine in order to generate an ignition spark.

19. The oscillating-piston engine of claim 1, wherein it comprises a fuel injection nozzle which is arranged at a circumferential angle of approximately 25 degrees before the ignition point in said revolution direction of said pistons.

20. The oscillating-piston engine of claim 1, wherein it comprises an output shaft arranged concentrically with said housing axis.

21. The oscillating-piston engine of claim 1, wherein said pistons are each mounted on an axially extending journal rod, said journal rods being joined at their ends to a first annular element and to a second annular element, the first annular element and the second annular element being movable in said revolution direction, the oscillating-piston engine further comprising an output shaft arranged concentrically with said housing axis, wherein said first annular element bares said output shaft centeredly on one outer side, and said first annular element, on the opposite side, is joined immovably to said second annular element via said journal rods.

22. The oscillating-piston engine of claim 21, wherein said cam piece engages into said first annular element which bears said output shaft, and is retained by said first annular element immovably with respect to the housing.

23. The oscillating-piston engine of claim 22, wherein said annular elements and said journal rods form a cylindrical unit with an axially continuously constant outside diameter.

24. The oscillating-piston engine of claim 1, wherein said pistons are each mounted on an axially extending journal rod, said journal rods being joined at their ends to a first annular element and to a second annular element, the first annular element and the second annular element being movable in said revolution direction, the oscillating-piston engine further comprising an output shaft arranged concentrically with said housing axis, wherein said first annular element bares said output shaft centeredly on one outer side, and said first annular element, on the opposite side, is joined immovably to said second annular element via said journal rods, and wherein said annular elements and said journal rods form a cylindrical unit with an axially continuously constant outside diameter.

* * * * *